(12) United States Patent
Konishi

(10) Patent No.: US 10,955,265 B2
(45) Date of Patent: Mar. 23, 2021

(54) ENCODER SCALE, MANUFACTURING METHOD FOR ENCODER SCALE, AND ENCODER

(71) Applicant: Seiko Epson Corporation, Tokyo (JP)

(72) Inventor: Akio Konishi, Matsumoto (JP)

(73) Assignee: Seiko Epson Corporation

( * ) Notice: Subject to any disclaimer, the term of this patent is extended or adjusted under 35 U.S.C. 154(b) by 332 days.

(21) Appl. No.: 16/173,023

(22) Filed: Oct. 29, 2018

(65) Prior Publication Data
US 2019/0128706 A1  May 2, 2019

(30) Foreign Application Priority Data
Oct. 30, 2017 (JP) .............................. JP2017-209385

(51) Int. Cl.
  G01D 5/34 (2006.01)
  G01D 5/347 (2006.01)
  G01D 5/353 (2006.01)
  G01D 5/36 (2006.01)

(52) U.S. Cl.
  CPC ......... *G01D 5/347* (2013.01); *G01D 5/34707* (2013.01); *G01D 5/35354* (2013.01); *G01D 5/366* (2013.01)

(58) Field of Classification Search
  CPC .............. G01D 5/347; G01D 5/34707; G01D 5/35354; G01D 5/38
  USPC ....................................... 250/231.13, 231.14
  See application file for complete search history.

(56) References Cited

U.S. PATENT DOCUMENTS 5,377,044 A * 12/1994 Tomono ............... G02B 5/1852
                                                                250/231.16
7,312,878 B2 * 12/2007 Speckbacher ........ G02B 5/1861
                                                                356/614

FOREIGN PATENT DOCUMENTS

JP           2012-159518 A       8/2012

* cited by examiner

*Primary Examiner* — Kevin K Pyo
(74) *Attorney, Agent, or Firm* — Harness, Dickey & Pierce, P.L.C.

(57) ABSTRACT

An encoder scale includes a tabular base material and an optical pattern provided above one surface of the base material, a first region and a second region being disposed side by side above the optical pattern. The first region includes a resin layer disposed above the base material and including photosensitive resin and a metal film disposed above the resin layer and formed of a metal material. The surface of the first region is configured mainly by a first surface having a normal line in the thickness direction of the base material. The surface of the second region is configured mainly by a second surface inclined with respect to the first surface.

13 Claims, 17 Drawing Sheets

ENCODER SCALE, MANUFACTURING METHOD FOR ENCODER SCALE, AND ENCODER

BACKGROUND

1. Technical Field

The present invention relates to an encoder scale, a manufacturing method for the encoder scale, and an encoder.

2. Related Art

An optical encoder is known as a type of an encoder. For example, a reflection-type optical encoder described in JP-A-2012-159518 (Patent Literature 1) includes a light source and a photodetector and a scale including an optical pattern that moves relatively to the light source and the photodetector. The light source emits a light beam toward the scale. The photodetector detects the light beam reflected and modulated by the scale. The scale described in Patent Literature 1 includes a glass substrate and a cyclic optical pattern formed on the surface of the glass substrate. The optical pattern is formed by a plurality of metal thin films one-dimensionally arrayed in a moving direction of the scale.

In the scale described in Patent Literature 1, the glass substrate is used as a base material. Therefore, flexibility of a shape is low and a reduction in cost is difficult. In the scale described in Patent Literature 1, a surface of a portion of the glass substrate where a metal film is not formed extends along the same direction as the surface of the metal film. Therefore, a part of the light beam reflected on the portion without being transmitted through the portion is detected by the photodetector. As a result, it is difficult to improve detection accuracy.

SUMMARY

An advantage of some aspects of the invention is to provide an encoder scale and a manufacturing method for the encoder scale that can improve detection accuracy while achieving a reduction in cost and an encoder including the encoder scale.

The invention can be implemented as the following application examples or forms.

An encoder scale according to an application example includes: a tabular base material; and an optical pattern provided on one surface of the base material, a first region and a second region being disposed side by side on the optical pattern. The first region includes: a resin layer disposed on the base material and including photosensitive resin; and a metal film disposed on the resin layer. A surface of the first region is configured mainly by a first surface having a normal line in a thickness direction of the base material. A surface of the second region is configured mainly by a second surface inclined with respect to the first surface.

With such an encoder scale, the surface of the first region is configured mainly by the first surface having the normal line in the thickness direction of the base material and the surface of the second region is configured mainly by the second surface inclined with respect to the first surface. Therefore, it is possible to differentiate directions of lights reflected in the first region and the second region from each other and selectively receive only the light reflected in the first region. Therefore, it is unnecessary to form the base material from a transparent material. It is possible to increase flexibility of selection of a material of the base material. As a result, it is possible to use a material more inexpensive and excellent in machinability. It is possible to increase a difference between light reception amounts in a state in which the light is irradiated on the first region and a state in which the light is not irradiated on the first region. As a result, it is possible to improve detection accuracy.

The resin layer included in the first region is patterned and disposed on the base material and includes photosensitive resin. Therefore, it is possible to highly accurately form the first region using a photolithography method. The metal film included in the first region is disposed on the resin layer and formed of a metal material. Therefore, it is possible to increase light reflectance of the first region. In this way, the first region includes the resin layer and the metal film. It is possible to improve the detection accuracy in this regard as well.

In the encoder scale according to the application example, it is preferable that the base material is formed of an anisotropically etchable crystal material.

With this configuration, it is possible to form the second surface of the second region using a crystal surface of the crystal material.

In the encoder scale according to the application example, it is preferable that the crystal material is single crystal silicon.

The single crystal silicon is inexpensive compared with other crystal materials and is easily highly accurately machined. Therefore, when the base material of the encoder scale is formed of the single crystal silicon, there is an advantage that it is possible to easily achieve a reduction in the cost and improvement of accuracy of the encoder scale.

In the encoder scale according to the application example, it is preferable that a plane orientation of the single crystal silicon is (100).

With this configuration, by using the [100] plane, a structure formed in the second region 122 can be formed as a regular quadrangle pyramid. Therefore, by using such single crystal silicon, it is possible to form the encoder scale suitable for not only a linear encoder but also a rotary encoder.

In the encoder scale according to the application example, it is preferable that the second surface is provided along a crystal surface of the crystal material.

With this configuration, it is possible to easily form the second surface having less variation of an inclination angle with respect to the first surface.

In the encoder scale according to the application example, it is preferable that the photosensitive resin is a negative type.

With this configuration, compared with when the photosensitive resin is a positive type, it is easy to highly accurately form the first region.

A manufacturing method for an encoder scale according to an application example includes: performing anisotropic etching on one surface of a tabular base material and forming a first region configured mainly by a surface inclined with respect to a surface having a normal line in a thickness direction of the base material; and applying photosensitive resin on the one surface and patterning the photosensitive resin to form a resin layer and thereafter forming a metal film on the resin layer to thereby form a second region configured mainly by a surface having a normal line in the thickness direction of the base material.

With such a manufacturing method for the encoder scale, it is possible to obtain the encoder scale that can improve detection accuracy while achieving a reduction in cost.

An encoder according to an application example includes: the encoder scale according to the application example explained above; a light emitting section configured to emit light toward the encoder scale; and a light detecting section configured to detect the light reflected on the encoder scale.

With such an encoder, it is possible to improve detection accuracy while achieving a reduction in cost.

A robot according to an application example includes the encoder scale according to the application example explained above.

With such a robot, it is possible to achieve a reduction in the cost of the robot by achieving a reduction in the cost of the encoder scale. It is possible to perform highly accurate operation control on the basis of a highly accurate detection result obtained using the encoder scale.

An electronic-component conveying apparatus according to an application example includes the encoder scale according to the application example explained above.

With such an electronic-component conveying apparatus, it is possible to achieve a reduction in the cost of the electronic-component conveying apparatus by achieving a reduction in the cost of the encoder scale. It is possible to perform highly accurate operation control on the basis of a highly accurate detection result obtained using the encoder scale.

A printer according to an application example includes the encoder scale according to the application example explained above.

With such a printer, it is possible to achieve a reduction in the cost of the printer by achieving a reduction in the cost of the encoder scale. It is possible to perform highly accurate operation control on the basis of a highly accurate detection result obtained using the encoder scale.

A projector according to an application example includes the encoder scale according to the application example explained above.

With such a projector, it is possible to achieve a reduction in the cost of the projector by achieving a reduction in the cost of the encoder scale. It is possible to perform highly accurate operation control on the basis of a highly accurate detection result obtained using the encoder scale.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained in detail below with reference to the accompanying drawings.

Encoder

First, prior to explanation of an encoder scale according to a first embodiment, an encoder according to the first embodiment (an encoder including the encoder scale according to the first embodiment) is briefly explained.

Figure 1:
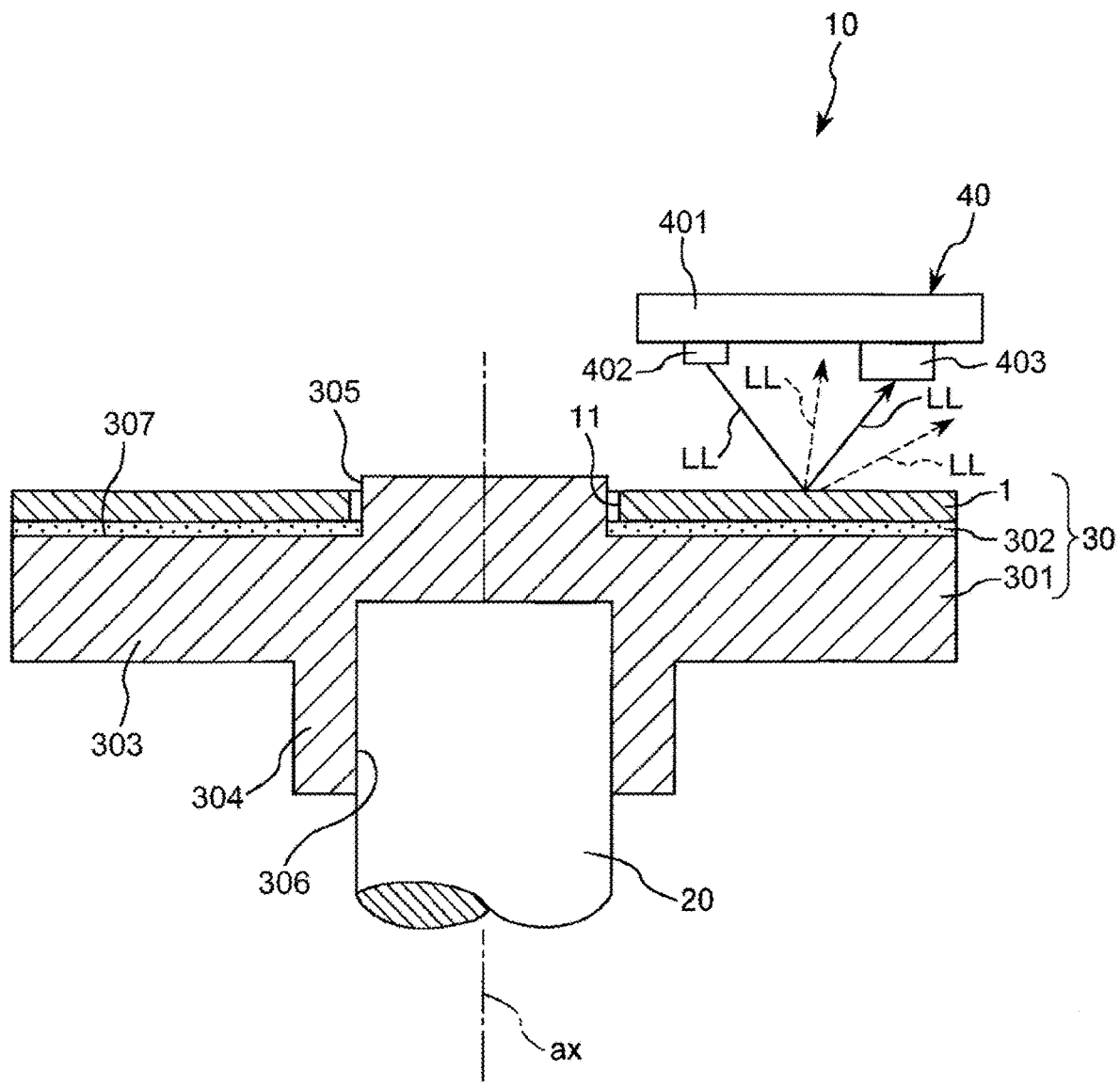
FIG. 1 is a longitudinal sectional view showing an encoder according to a first embodiment of the invention.
Figure 2:
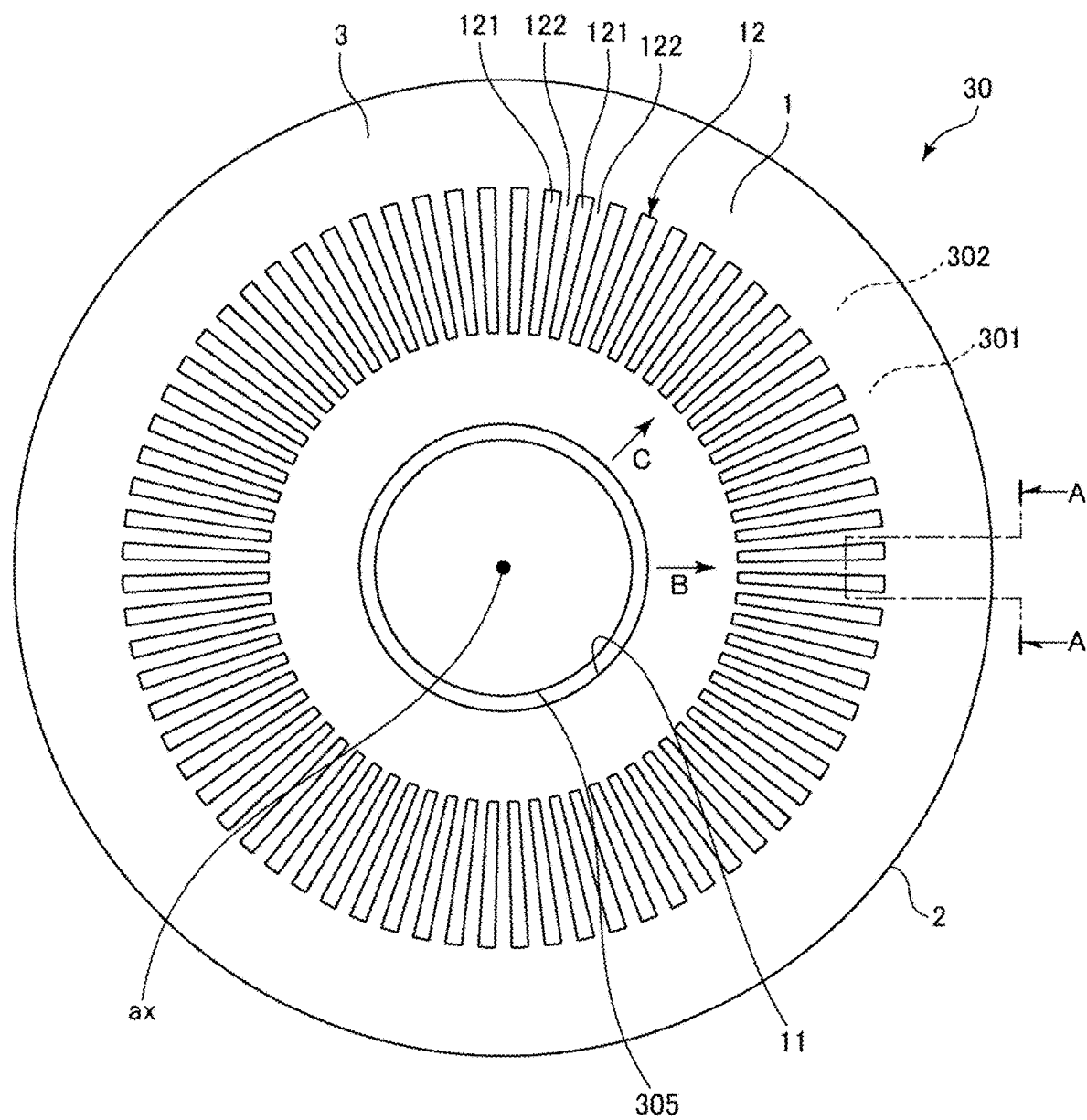
FIG. 2 is a plan view of an encoder scale unit included in the encoder shown in FIG. 1.

FIG. 1 is a longitudinal sectional view showing the encoder according to the first embodiment. FIG. 2 is a plan view of an encoder scale unit included in the encoder shown in FIG. 1. Note that, in the following explanation, for convenience of explanation, the upper side in FIG. 1 is referred to as "upper" and the lower side in FIG. 1 is referred to as "lower".

An encoder 10 shown in FIG. 1 includes an encoder scale unit 30 fixed to an end portion of a rotating shaft 20 included in a not-shown motor or the like and an optical sensor 40 configured to detect a rotation state of the encoder scale unit 30.

The encoder scale unit 30 includes a hub 301 fixed to the rotating shaft 20 and an encoder scale 1 bonded to a supporting section 303 of the hub 301 by an adhesive 302 such as an epoxy-based adhesive or an acrylic-based adhesive.

The hub 301 includes a supporting section 303 formed in a disk shape, a projecting section 304 projecting from one surface (on the lower side in FIG. 1) (the lower surface) of the supporting section 303, a convex section 305 projecting from the other surface (on the upper side in FIG. 1) (the upper surface) of the supporting section 303, and a concave section 306 opened on a distal end face (a surface on the lower side in FIG. 1) of the projecting section 304. These sections are coaxially provided centering on an axis ax. The end portion of the rotating shaft 20 is fixed to the concave section 306 in an inserted (e.g., pressed-in) state. A constituent material of such a hub 301 is not particularly limited.

Examples of the constituent material include metal materials such as aluminum and stainless steel. Note that a through-hole, into which the rotating shaft 20 is inserted, may be provided in the hub 301 instead of the concave section 306. The hub 301 may be configured integrally with the rotating shaft 20.

The upper surface of the supporting section 303 is a setting surface 307 on which the encoder scale 1 is set. The convex section 305 functioning as a positioning section for performing positioning in an in-plane direction of the encoder scale 1 is provided on the upper surface (the setting surface 307) of the supporting section 303. In this embodiment, as shown in FIG. 2, the external shape of the convex section 305 is formed in a circular shape when viewed from a direction along the axis ax (hereinafter referred to as "plan view" as well). The convex section 305 is formed such that the center axis of the convex section 305 coincides with the axis ax (the center axis of the rotating shaft 20). Note that the external shape in the plan view of the convex section 305 is not limited to the circle and may be a polygon such as a square or a pentagon.

The encoder scale 1 is formed in a tabular shape (a disk shape). A hole 11 piercing through the encoder scale 1 in the thickness direction (the up-down direction in FIG. 1) is formed in the center of the encoder scale 1. The convex section 305 explained above is inserted through the hole 11. In this embodiment, as shown in FIG. 2, the hole 11 is formed in a circular shape in the plan view. The diameter (at the normal temperature) of the convex section 305 is set smaller than the diameter (at the normal temperature) of the hole 11. Note that the external shape in the plan view of the hole 11 is not limited to the circle and may be a polygon such as a square or a pentagon and may be different from the external shape in the plan view of the convex section 305.

On the upper surface of the encoder scale 1, as shown in FIG. 2, as a pattern with which a rotation amount (an angle), rotating speed, and the like of the encoder scale 1 can be detected, an optical pattern 12 in which first regions 121 and second regions 122 having different reflecting directions of light LL along the circumferential direction centering on the axis ax are alternately arranged along the circumferential direction is formed. The first regions 121 and the second regions 122 are formed by surfaces having normal lines in directions different from each other. Note that the encoder scale 1 is explained in detail below.

The optical sensor 40 includes a light source section 402 including a light emitting element such as a laser diode or a light emitting diode that emits the light LL toward the encoder scale 1 of the encoder scale unit 30 and a light receiving section 403 including a light receiving element such as a photodiode that receives the light LL (reflected light) from the encoder scale 1. The light source section 402 and the light receiving section 403 are mounted on a substrate 401.

In such an optical sensor 40, the optical pattern 12 explained above is formed on the upper surface (an irradiation surface) of the encoder scale 1. Therefore, according to rotation of the encoder scale 1 around the axis ax, the optical sensor 40 alternately repeats a state in which the light LL reflected on the optical pattern 12 is made incident on the light receiving section 403 (a state of the light LL indicated by a solid line in FIG. 1) and a state in which the light LL is not made incident on the light receiving section 403 (a state of the light LL indicated by a broken line in FIG. 1). Therefore, a waveform of an output signal (a current value) from the light receiving section 403 changes according to the rotation of the encoder scale 1 around the axis ax. A rotation state (a rotation angel, rotating speed, etc.) of the encoder scale 1 can be detected on the basis of an output signal from such a light receiving section 403.

Although not shown in FIG. 1, the light receiving section 403 includes two light receiving elements provided in different positions in the circumferential direction centering on the axis ax. One light receiving element outputs an A phase signal and the other light receiving element outputs a B phase signal, the phase of which is shifted from the phase of the A phase signal by 45°. Note that the light source section 402 may include two light emitting elements corresponding to the two light receiving elements included in the light receiving section 403. Light from one light emitting element may be separated using a slit plate or the like to correspond to the two light receiving elements. The light source section 402 and the light receiving section 403 may respectively include optical elements such as lenses.

The encoder 10 is briefly explained above. The encoder scale 1 is explained in detail below.

Encoder Scale

Figure 3:
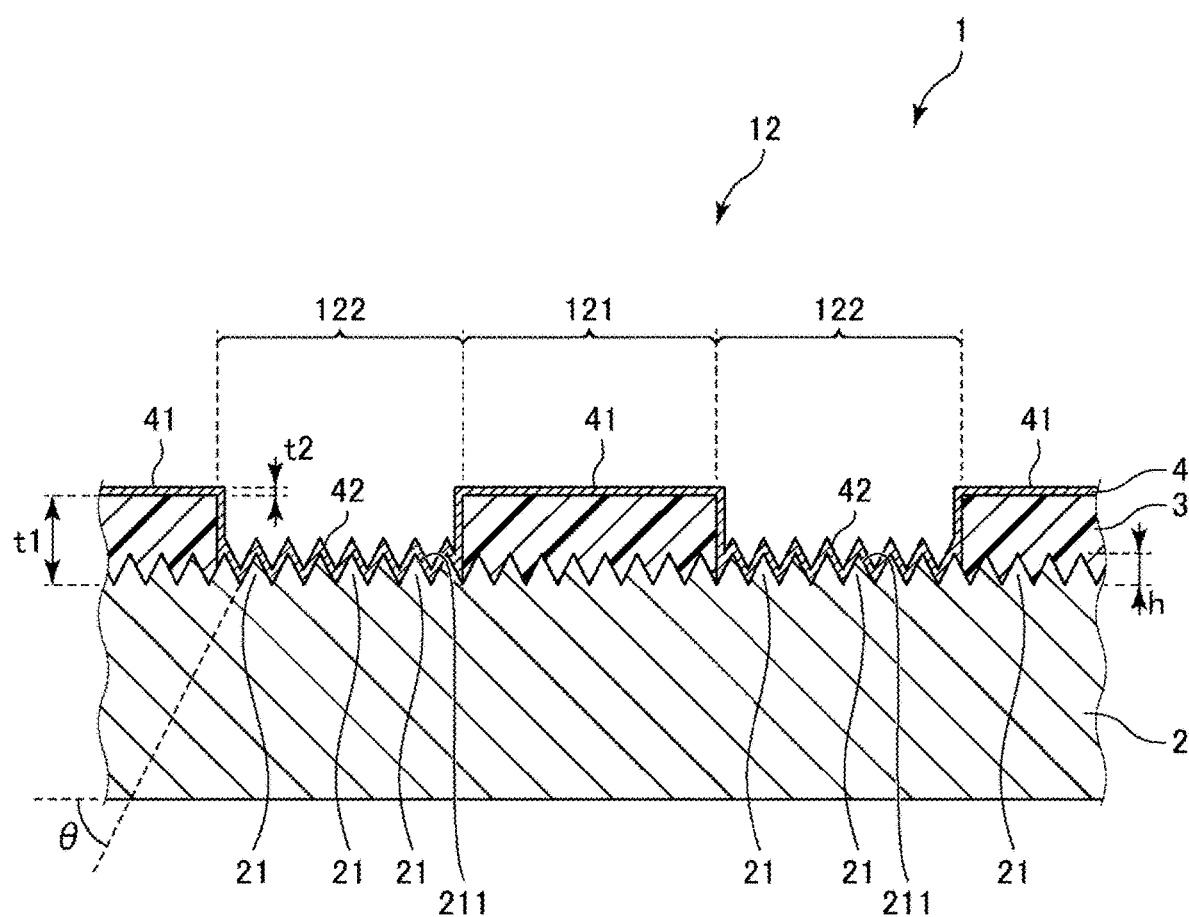
FIG. 3 is an A-A line sectional view in FIG. 2 (a sectional view of an encoder scale).
Figure 4:
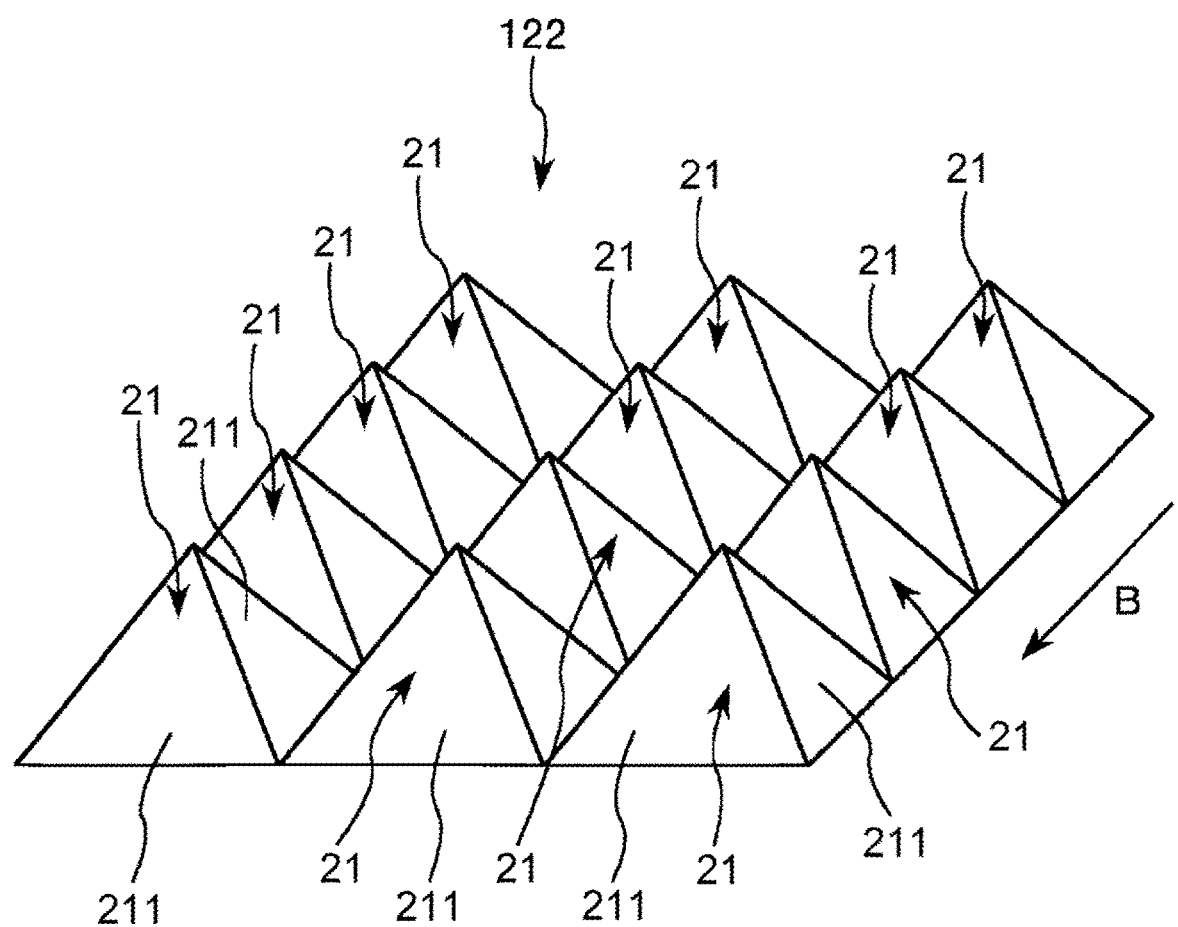
FIG. 4 is a perspective view showing a part (a plurality of convex sections) in a second region shown in FIG. 3.
Figure 5:
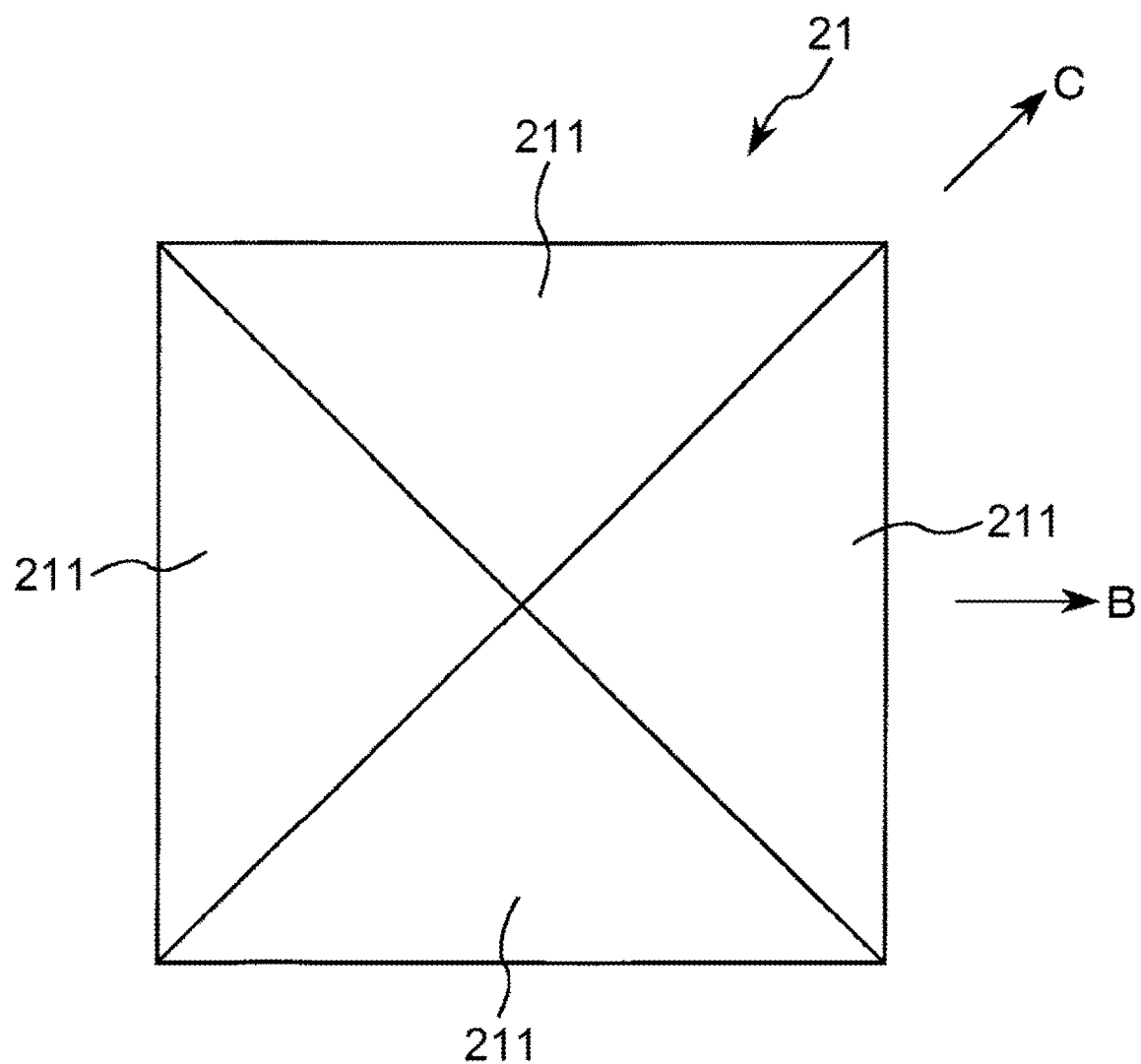
FIG. 5 is a plan view of the convex section (a second surface) provided in the second region shown in FIG. 3.
Figure 6:
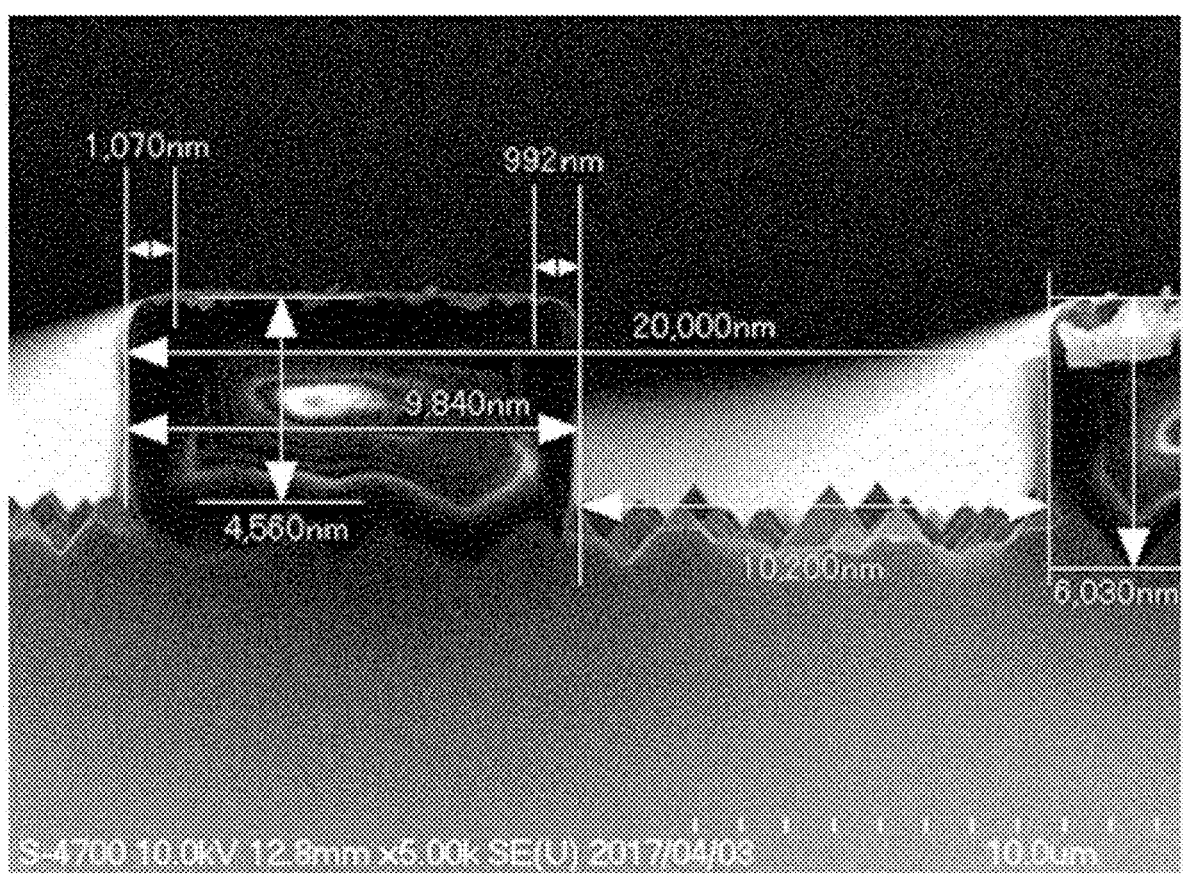
FIG. 6 is an SEM photograph showing a cross section of a part of the encoder scale.
Figure 7:
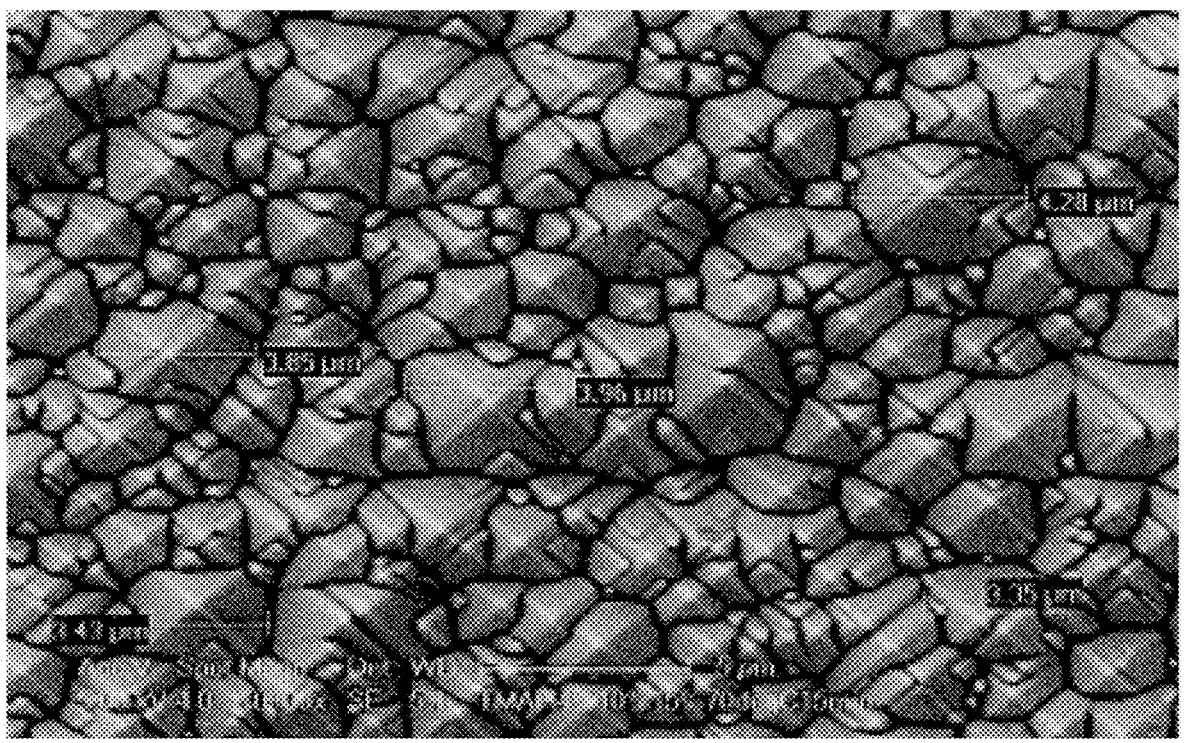
FIG. 7 is an SEM photograph showing a surface state of a part of the encoder scale.
Figure 8:
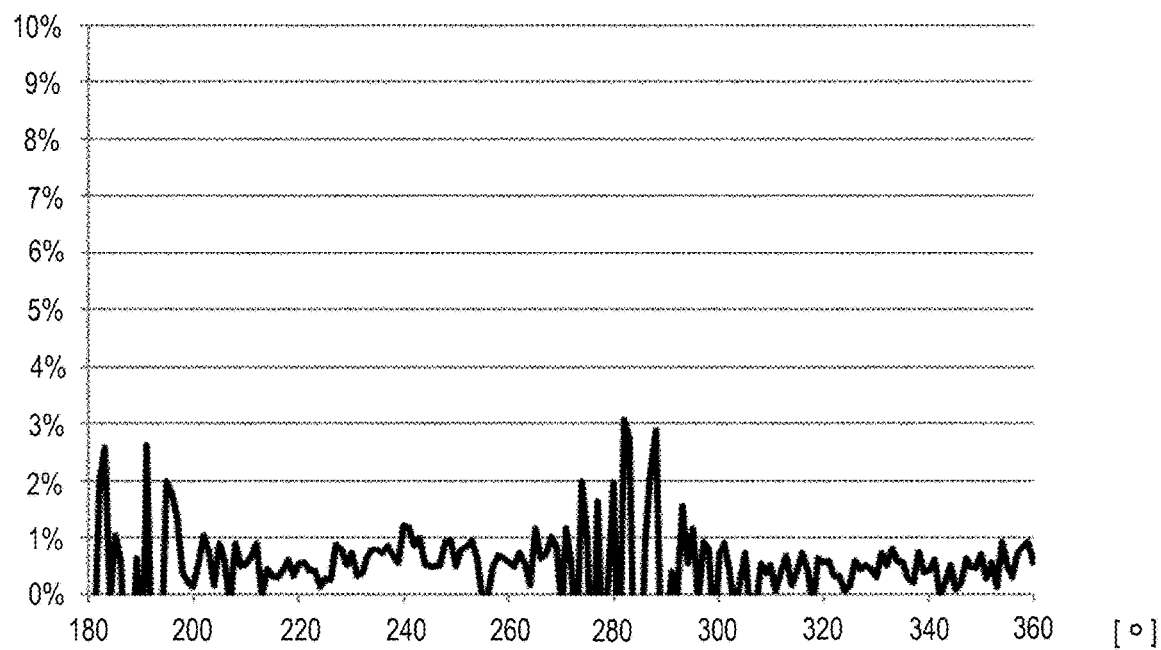
FIG. 8 is a graph showing a light reflection characteristic of the second region (a relation between a rotation angle and a light reception amount in a light receiving section).

FIG. 3 is an A-A line sectional view in FIG. 2 (a sectional view of the encoder scale). FIG. 4 is a perspective view showing a part (a plurality of convex sections) of the second region shown in FIG. 3. FIG. 5 is a plan view of the convex section (a second surface) provided in the second region shown in FIG. 3. FIG. 6 is an SEM photograph showing a cross section of a part of the encoder scale. FIG. 7 is an SEM photograph showing a surface state of a part of the encoder scale. FIG. 8 is a graph showing a light reflection characteristic of the second region (a relation between a rotation angle and a light reception amount in the light receiving section). Note that, in the following explanation, the upper side in FIG. 3 is referred to as "upper" and the lower side in FIG. 3 is referred to as "lower".

As explained above, on the upper surface of the encoder scale 1, the optical pattern 12 in which the first regions 121 and the second regions 122 having the different reflecting directions of the light LL along the circumferential direction centering on the axis ax are alternately arranged along the circumferential direction of a base material 2 is formed. The first regions 121 and the second regions 122 of the optical pattern 12 respectively extend in a belt shape along the radial direction of the encoder scale 1. In FIG. 2, in a region where the first regions 121 and the second regions 122 are disposed side by side in the circumferential direction centering on the axis ax, the respective widths of the first regions 121 and the second regions 122 increase from the inner side toward the outer side in the radial direction of the encoder scale 1 such that the first regions 121 and the second regions 122 have the same shape each other in the plan view. Note that the plan view shape of the first regions 121 and the second regions 122 is not limited to the shape shown in FIG. 2. For example, the width of the first regions 121 or the second regions 122 may be fixed over the radial direction of the encoder scale 1 in the plan view.

The encoder scale 1 includes the tabular (disk-like) base material 2, a resin layer 3 patterned and provided on the upper surface of the base material 2, and a metal film 4 provided to cover the base material 2 and the resin layer 3. Regions where the resin layer 3 is provided in the plan view form the first regions 121. Regions where the resin layer 3 is not provided among the first regions 121 in the plan view form the second regions 122. Therefore, the upper surfaces of portions of the metal film 4 overlapping the resin layer 3 form the surfaces of the first regions 121, that is, reflection surfaces 41. The upper surfaces of portions of the metal film 4 not overlapping the resin layer 3 form the surfaces of the second regions 122, that is, reflection surfaces 42.

A plurality of convex sections 21 are provided on one surface (on the upper side in FIG. 3) of the base material 2. As shown in FIG. 4, each convex section 21 is formed in a pyramid shape (a quadrangular pyramid shape). The convex section 21 includes four inclined surfaces 211 inclined at an inclination angle θ with respect to a plate surface of the base material 2. The inclination angle θ only has to be set such that the reflection surface 42 of the metal film 4 can reflect the light LL in a direction different from the reflection surface 41 and is not particularly limited. For example, when the base material 2 is formed of a single crystal silicon as explained below, the inclination angle θ is approximately 55° (a theoretical value). Note that, in this embodiment, the plurality of convex sections 21 are disposed over the entire region of one surface of the base material 2. However, the plurality of convex sections 21 are not limited to this. For example, the convex sections 21 may be omitted in regions right under the resin layer 3. However, by disposing the plurality of convex sections 21 over the entire region of one surface of the base material 2, there is an advantage that, when the plurality of convex sections 21 are formed, for example, positioning of forming regions of the plurality of convex sections 21 is unnecessary and the formation of the plurality of convex sections 21 is simple.

In FIG. 4, a plurality of convex sections 22 have the same size one another and are regularly disposed. However, the plurality of convex sections 22 may have sizes different from one another and may be disposed at random. As shown in FIG. 5, each convex section 22 is formed in a square shape in the plan view. The directions of the plurality of convex sections 22 in the plan view are aligned. The plurality of convex sections 22 may face any direction in the plan view. However, in this embodiment, the plurality of convex sections 22 face the same direction among the plurality of second regions 122. Therefore, when each side in the plan view of the convex section 22 provided in a certain second region 122 is parallel or orthogonal to an extending direction B of the certain second region 122, each side in the plan view of the convex section 22 provided in another second region 122 different from the certain second region 122 by 55° around the axis ax is inclined by 55° with respect to an extending direction C of the other second region 122.

Such a base material 2 may be formed of any material. However, the base material 2 is desirably formed of an anisotropically etchable crystal material such as single crystal silicon, silicon carbide, or crystal. Consequently, it is possible to easily and highly accurately form the inclined surface 211 explained above. It is possible to form the reflection surface 42 (the second surface) of the second region 122 using the inclined surface 211, which is a crystal surface of the crystal material.

The crystal material used in the base material 2 is desirably single crystal silicon. The single crystal silicon is inexpensive compared with other crystal materials and is easily highly accurately machined. Therefore, when the base material 2 of the encoder scale 1 is formed of the single crystal silicon, there is an advantage that it is possible to easily achieve a reduction in the cost and improvement of accuracy of the encoder scale 1.

In particular, a plane orientation of the single crystal silicon used in the base material 2 is desirably (100). Consequently, by using the [100] plane, a structure formed in the second region 122 can be formed as a regular quadrangle pyramid. Therefore, by using such single crystal silicon, it is possible to form the encoder scale 1 suitable for not only a linear encoder but also a rotary encoder. SEM photographs of the encoder scale 1 formed using the single crystal silicon in this way are shown in FIGS. 6 and 7. An amount of the light LL reflected in the second region 122 of the encoder scale 1 formed using the single crystal silicon and received by the light receiving section 403 can be set to 3% or less with respect to an amount of the light LL emitted from the light source section 402, as shown in FIG. 8.

When the base material 2 is formed of the anisotropically etchable crystal material, the reflection surface 42 (the second surface) of the metal film 4 is desirably provided along the crystal surface (the inclined surface 211) of the crystal material used in the base material 2. Consequently, it is possible to easily form the reflection surface 42 (the second surface) with less variation of the inclination angle θ with respect to the reflection surface 41 (the first surface).

The resin layer 3 is disposed on one surface (on the upper side in FIG. 3) of the base material 2. In this embodiment, the plurality of convex sections 21 are disposed over the entire region of one surface of the base material 2 as explained above. Therefore, the plurality of convex sections 21 are present right under the resin layer 3. The resin layer 3 is formed in a shape corresponding to the shape of the first region 121 in the plan view. The upper surface of the resin layer 3 is formed as a flat surface extending along the plate surface of the base material 2. Note that, in the cross section shown in FIG. 3, a side surface of the resin layer 3 is orthogonal to the upper surface of the resin layer 3. However, the side surface of the resin layer 3 may be inclined with respect to the upper surface of the resin layer 3. In that case, from the viewpoint of easiness in defining the width of the reflection surface 41, the side surface is desirably formed such that the width of the resin layer 3 decreases toward the base material 2 side.

Such a resin layer 3 is formed using photosensitive resin. Such photosensitive resin is not particularly limited. Examples of the photosensitive resin include polyimide resin and epoxy resin having photosensitivity and copolymer of the polyimide resin and the epoxy resin. Such photosensitive resin may be either a positive type or a negative type. However, the photosensitive resin is desirably the negative type from a viewpoint that the dimension accuracy of the reflection surface 41 can be improved by setting corner portions formed by the upper surface and the side surface of the resin layer 3 to a right angle or an acute angle and a viewpoint of environmental reliability. Because such photosensitive resin is the negative type in this way, compared with when the photosensitive resin is the positive type, it is easy to highly accurately form the first region 121. Note that the constituent material of the resin layer 3 may include materials other than the photosensitive resin explained above, for example, a filler, a pigment, and various additives.

Thickness $t_1$ of the resin layer 3 is desirably larger than height h of the convex section 21 explained above. Consequently, even if the plurality of convex sections 21 are provided right under the resin layer 3, flatness of the reflection surface 41 can be increased. In particular, a ratio $t_1/h$ of the thickness $t_1$ of the resin layer 3 and the height h of the convex section 21 is desirably 2 or more and 12 or less, more desirably 2 or more and 10 or less, and still more desirably 2 or more and 4 or less. Consequently, when the resin layer 3 is formed on the base material 2, even when the resin layer 3 is formed on the plurality of convex sections 21, the resin layer 3 can be prevented from being easily affected by the shape of the plurality of convex sections 21. The resin layer 3 having a flat surface can be formed even if planarization treatment such as CMP (chemical mechanical polishing) is not performed.

The metal film 4 is disposed on the base material 2 and the resin layer 3. The upper surface (the surface on the opposite side of the base material 2) of the metal film 4 configures the surfaces of the first region 121 and the second region 122 as explained above. In this embodiment, the metal film 4 is disposed not only on the resin layer 3 but also on a portion of the base material 2 where the resin layer 3 is not disposed. However, the metal film 4 may not be disposed on the base material 2. In this case, the surface of the base material 2 (more specifically, the inclined surface 211 of the convex section 21) configures the surface of the second region 122. However, because the metal film 4 is disposed on the surface of the second region 122, the reflectance of the light LL of the second region 122 can be increased irrespective of the constituent material of the base material 2. A desire reflection characteristic of the second region 122 explained above is easily obtained. In this embodiment, the metal film 4 is disposed not only on the upper surface of the resin layer 3 but also on the side surface of the resin layer 3. However, the metal film 4 may not be disposed on the side surface of the resin layer 3.

As the constituent material of such a metal film 4, a constituent material with which a desired reflection characteristic of the reflection surfaces 41 and 42 can be obtained only has to be used. Various metal materials can be used as the constituent material. Examples of the constituent material include metal such as aluminum, copper, iron, nickel, titanium, and tungsten and alloys (composite materials) including these kinds of metal. Thickness t2 (film thickness) of the metal film 4 is not particularly limited. The thickness t2 is desirably 10 nm or more and 1000 nm or less and more desirably 20 nm or more and 50 nm or less.

As explained above, the encoder scale 1 includes the tabular (disk-like) base material 2 and the optical pattern 12 provided on one surface (on the upper side in FIGS. 1 and 3) of the base material 2, the first regions 121 and the second regions 122 being alternately disposed side by side on the optical pattern 12. The first region 121 includes the resin layer 3 patterned and disposed on the base material 2 and including the photosensitive resin and the metal film 4 disposed on the resin layer 3. In particular, the surface of the first region 121 is configured mainly by the reflection surface 41, which is the first surface having the normal line in the thickness direction of the base material 2 (the axis ax direction). The surface of the second region 122 is configured mainly by the reflection surface 42, which is the second surface inclined with respect to the reflection surface 41.

"The first region 121 is configured mainly by the reflection surface 41 (the first surface)" means that an area occupancy ratio of the reflection surface 41 (the first surface) in the first region 121 is 50% or more (desirably 70% or more and more desirably 90% or more) in the plan view. "The second region 122 is configured mainly by the reflection surface 42 (the second surface)" means that an area occupancy ratio of the reflection surface 42 (the second surface) in the second region 122 is 50% or more (desirably 70% or more and more desirably 90% or more) in the plan view. The second region 122 may include a surface having a normal line in the thickness direction of the base material 2 like the reflection surface 41. However, in that case, an area occupancy ratio of the surface in the second region 122 only has to be smaller than an area occupancy ratio of the reflection surface 41 (the first surface) in the first region 121 in the plan view.

With such an encoder scale 1, the first region 121 is configured mainly by the reflection surface 41 having the normal line in the thickness direction of the base material 2 and the second region 122 is configured mainly by the reflection surface 42 inclined with respect to the reflection surface 41. Therefore, it is possible to differentiate directions of lights reflected in the first region 121 and the second region 122 from each other and selectively receive, in the light receiving section 403, only the light LL reflected in the first region 121. Therefore, it is unnecessary to form the base material 2 from a transparent material. It is possible to increase flexibility of selection of a material of the base material 2. As a result, it is possible to use a material more inexpensive and excellent in machinability. It is possible to increase a difference between light reception amounts in a state in which the light LL is irradiated on the first region 121 and a state in which the light LL is not irradiated on the first region 121. As a result, it is possible to improve detection accuracy. More specifically, the light reception amount of the light receiving section 403 in the state in which the light LL is irradiated on the first region 121 can be set to 57% or more with respect to a light amount of the light LL emitted from the light source section 402. The light reception amount of the light receiving section 403 in the state in which the light LL is irradiated on the second region 122 can be set to 5% or less with respect to the light amount of the light LL emitted from the light source section 402.

On the other hand, for example, if the second region 122 is configure by a flat surface having a normal line parallel to the normal line of the first region 121 (the reflection surface 41), even if processing for reducing reflection of the light LL (e.g., surface roughening for forming an uneven surface configured by mainly combining curved surfaces to scatter light or blackening for increasing a light absorption ratio) is applied to the flat surface, it is difficult to sufficiently reduce reflectance in the second region 122 (to 5% or less). Therefore, in the state in which the light LL emitted from the light source section 402 is irradiated on the second region 122, an amount of the light LL reflected in the second region 122 and made incident on the light receiving section 403 cannot be sufficiently reduced.

With the encoder scale 1, the resin layer 3 included in the first region 121 is patterned and disposed on the base material 2 and includes the photosensitive resin. Therefore, it is possible to highly accurately form the first region 121 using the photolithography method. The metal film 4 (a portion of the reflection surface 41) included in the first region 121 is disposed on the resin layer 3 and formed of the metal material. Therefore, it is possible to increase light reflectivity of the first region 121. In this way, the first region 121 includes the resin layer 3 and the metal film 4. Therefore, it is possible to improve the detection accuracy in this regard as well.

As explained above, the encoder 10 includes the encoder scale 1 explained above, the light source section 402, which is a light emitting section configured to emit the light LL toward the encoder scale 1, and the light receiving section 403, which is a light detecting section configured to detect the light LL reflected on the encoder scale 1. With such an encoder 10, it is possible to improve the detection accuracy while achieving a reduction in cost.

Manufacturing Method for the Encoder Scale

Figure 9:
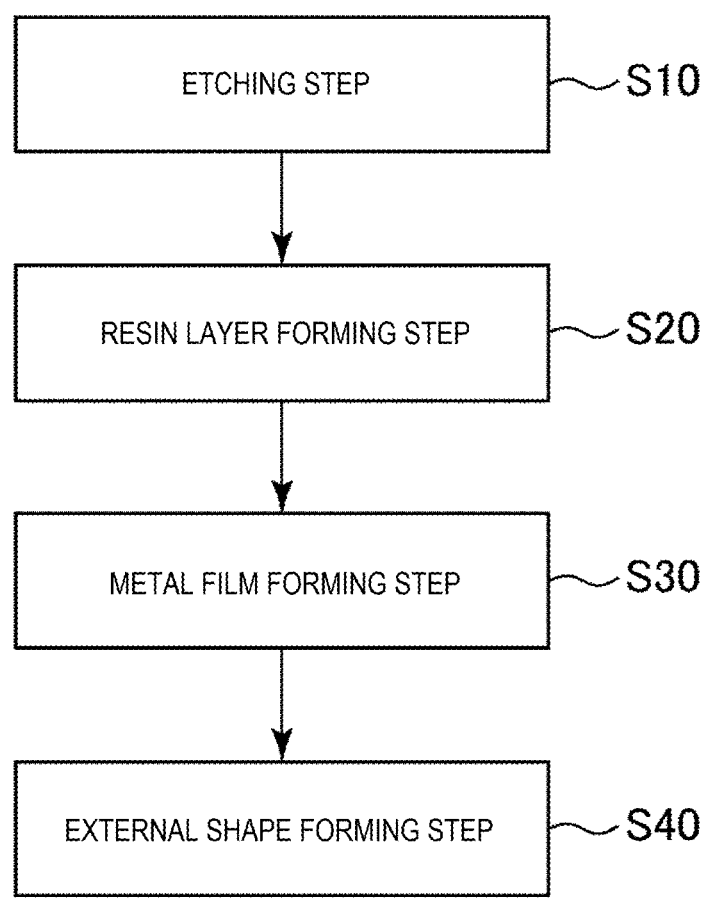
FIG. 9 is a flowchart for explaining a manufacturing method for the encoder scale shown in FIG. 3.
Figure 10:
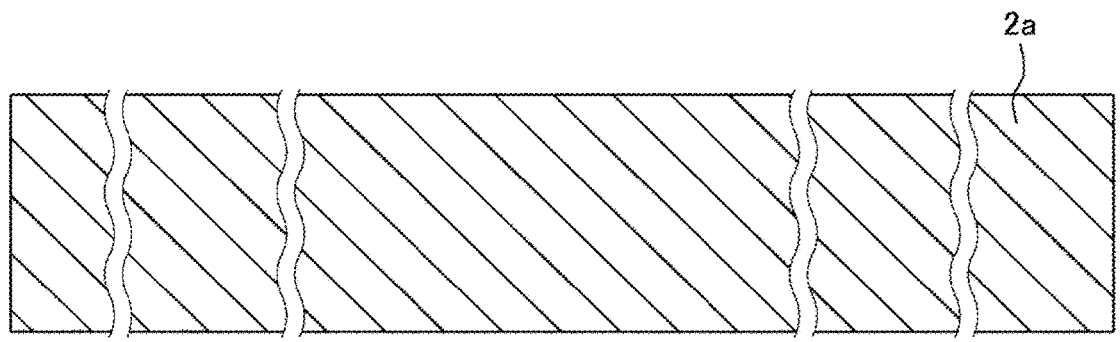
FIG. 10 is a sectional view for explaining a base material preparing step in an etching step shown in FIG. 9.
Figure 11:
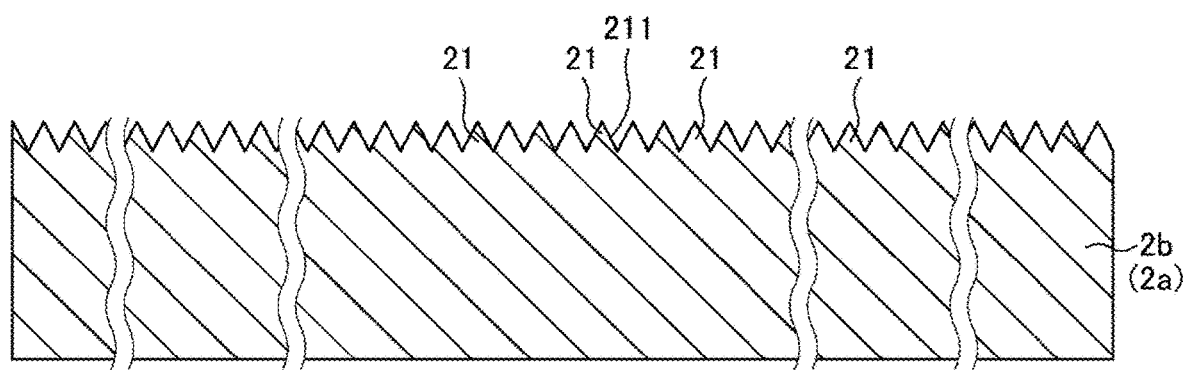
FIG. 11 is a sectional view for explaining an anisotropic etching step in the etching step shown in FIG. 9.
Figure 12:
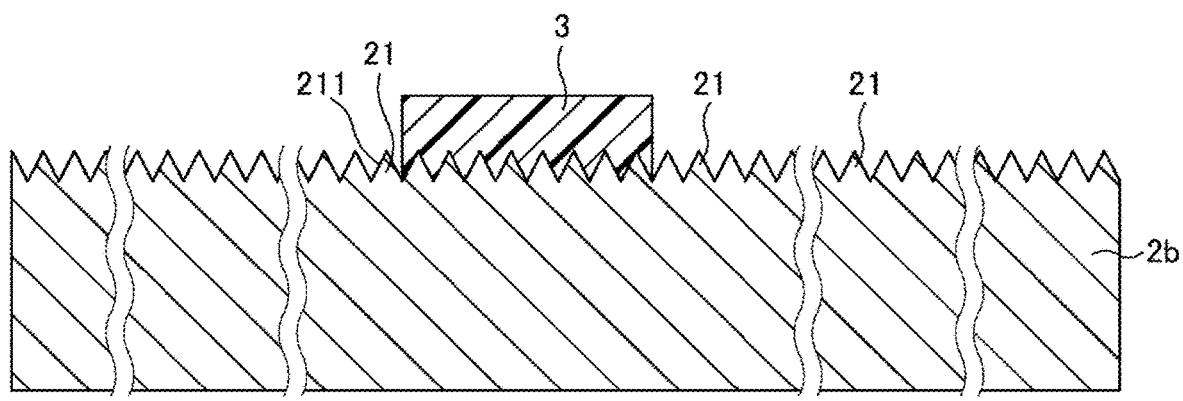
FIG. 12 is a sectional view for explaining a resin layer forming step shown in FIG. 9.
Figure 13:
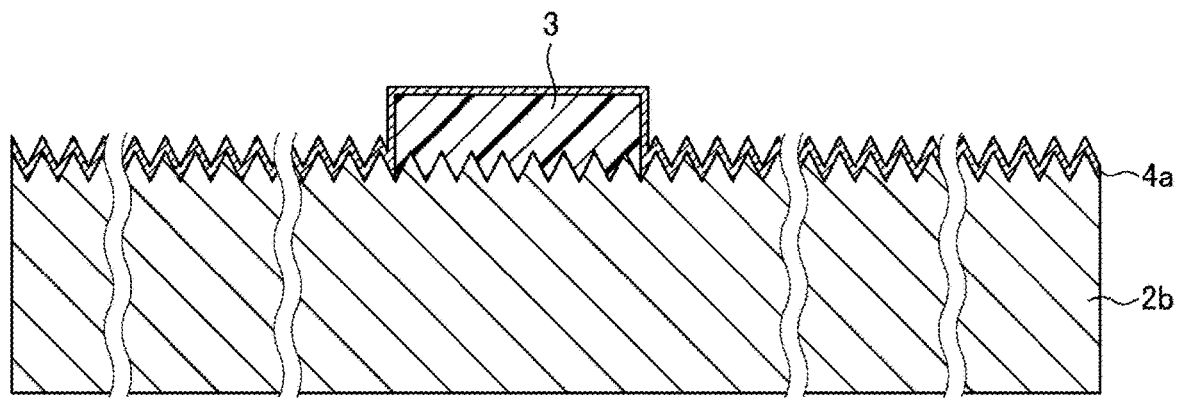
FIG. 13 is a sectional view for explaining a metal film forming step shown in FIG. 9.
Figure 14:
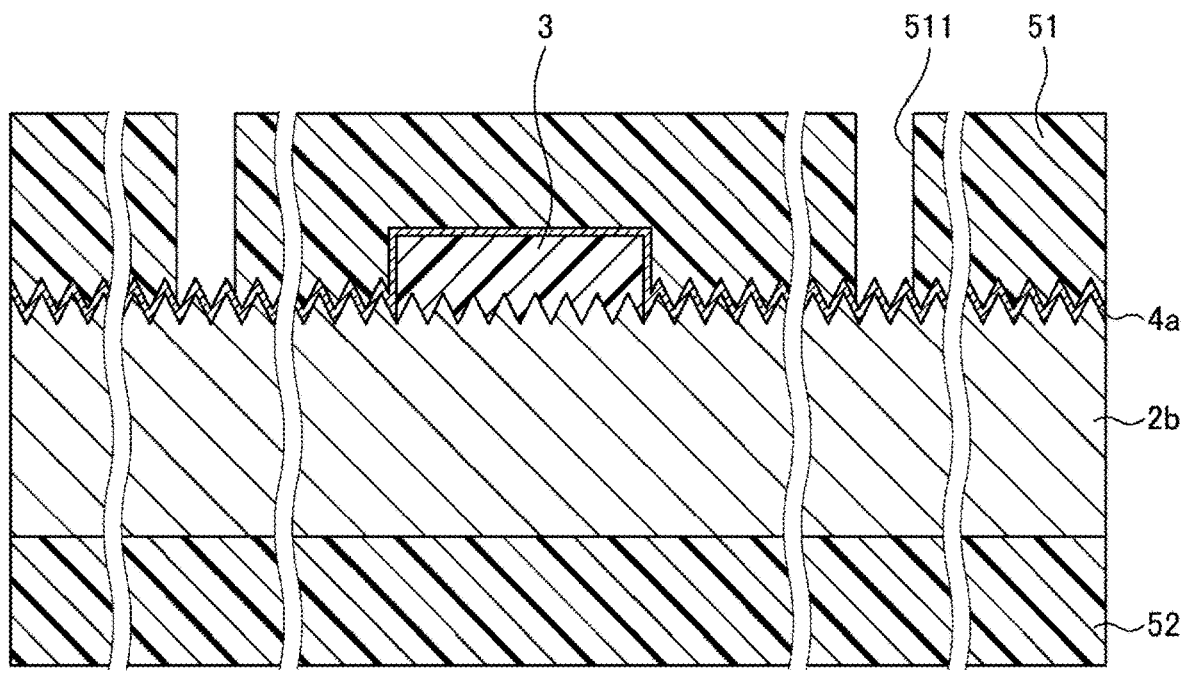
FIG. 14 is a sectional view for explaining a mask forming step in an external shape forming step shown in FIG. 9.
Figure 15:
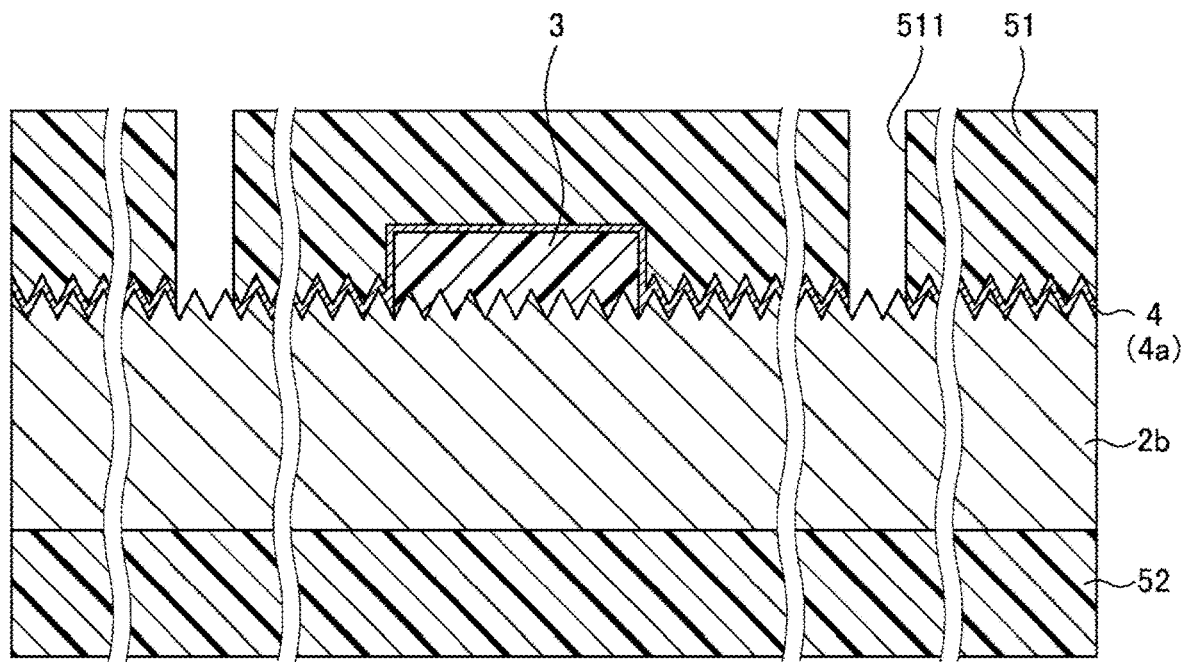
FIG. 15 is a sectional view for explaining a metal film cutting step in the external shape forming step shown in FIG. 9.
Figure 16:
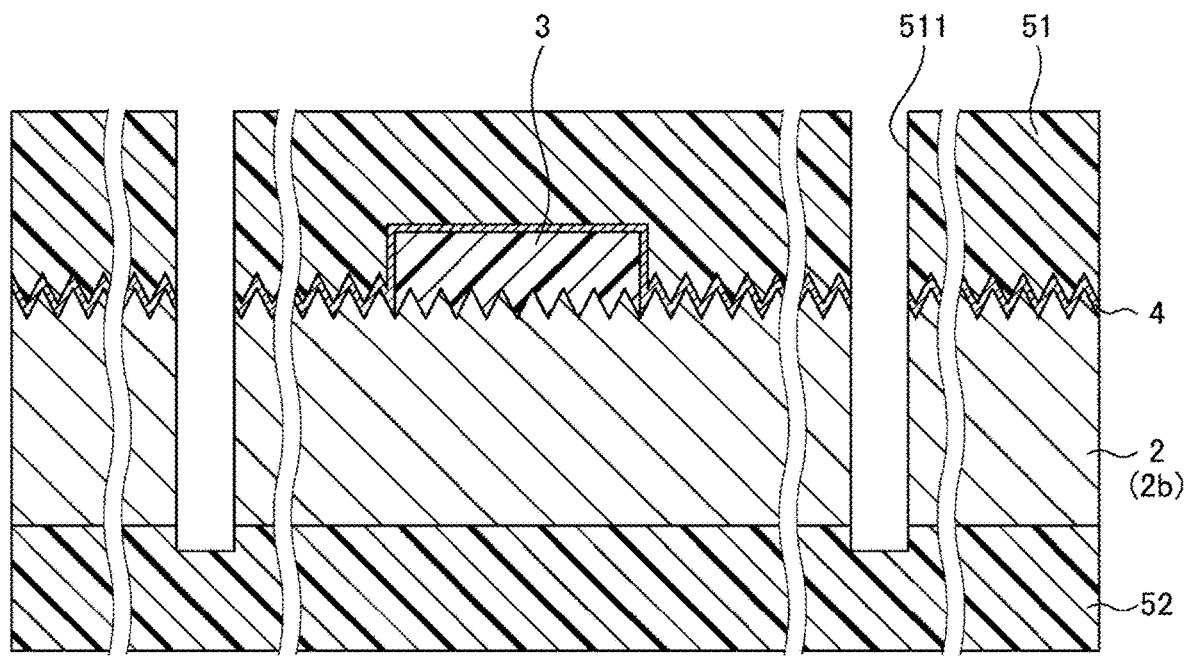
FIG. 16 is a sectional view for explaining a base material cutting step in the external shape forming step shown in FIG. 9.

FIG. 9 is a flowchart for explaining a manufacturing method for the encoder scale shown in FIG. 3. FIG. 10 is a sectional view for explaining a base material preparing step in an etching step shown in FIG. 9. FIG. 11 is a sectional view for explaining an anisotropic etching step in the etching step shown in FIG. 9. FIG. 12 is a sectional view for explaining a resin layer forming step shown in FIG. 9. FIG. 13 is a sectional view for explaining a metal film forming step shown in FIG. 9. FIG. 14 is a sectional view for explaining a mask forming step in an external shape forming step shown in FIG. 9. FIG. 15 is a sectional view for explaining a metal film cutting step in the external shape forming step shown in FIG. 9. FIG. 16 is a sectional view for explaining a base material cutting step in the external shape forming step shown in FIG. 9.

A manufacturing method for the encoder scale 1 includes, as shown in FIG. 9, an etching step S10, a resin layer forming step S20, a metal film forming step S30, and an external shape forming step S40. The steps are sequentially explained below. Note that, in the following explanation, as an example, the base material 2 is formed of (100) single crystal silicon.

Etching Step S10

First, as shown in FIG. 10, a base material 2a, which is a (100) single crystal silicon substrate, is prepared. As the base material 2a, the single crystal silicon substrate may be directly used. However, a substrate obtained by grinding and thinning one surface of the single crystal silicon substrate is used according to necessity.

Subsequently, as shown in FIG. 11, one surface (the upper surface) of the base material 2a is uniformly anisotropically etched. Consequently, a base material 2b including the plurality of convex sections 21 is obtained. A protective film of a resist material or the like may be provided on the other surface of the base material 2a. The plurality of convex sections 21 may be formed on the other surface of the base material 2a.

The anisotropic etching (wet etching) is not particularly limited. For example, alkali etching liquid such as KOH or TMAH is used.

Resin Layer Forming Step S20

Subsequently, as shown in FIG. 12, the resin layer 3 is formed. More specifically, photosensitive resin before exposure to light is uniformly applied to the upper surface (a surface having the plurality of convex sections 21) of the base material 2b and is exposed to light and developed to form the resin layer 3. After the development, planarization processing such as CMP (chemical mechanical polishing) may be performed according to necessity to form the resin layer 3.

Metal Film Forming Step S30

Subsequently, as shown in FIG. 13, a metal film 4a is formed. More specifically, a film of a metal material is uniformly formed by a sputtering method or the like on a surface on the resin layer 3 side of a stacked body formed by the base material 2b and the resin layer 3 to form the metal film 4a.

External Shape Forming Step S40

Subsequently, an external shape (including the hole 11) of the encoder scale 1 is formed. More specifically, as shown in FIG. 14, resist layers 51 and 52 are formed as masks (protective films) on both surfaces of a stacked body formed by the base material 2b, the resin layer 3, and the metal film 4a. Thereafter, as shown in FIG. 15, the metal film 4a is cut by removing a part of the metal film 4a with wet etching or the like via openings 511 of the resist layer 51. Thereafter, as shown in FIG. 16, the base material 2b is cut by removing a part of the base material 2b with dry etching via the openings 511. Thereafter, although not shown in FIG. 16, the resist layer 51 and 52 are removed.

The dry etching used for the cutting of the base material 2b in this step is not particularly limited. Examples of the dry etching include an Si high speed etching method, a Bosch process method, RIE (reactive ion etching), and ICP (Inductively Coupled Plasma). $Cl_2$+HBr, $SF_6$, or the like can be used as an etching gas.

As explained above, the encoder scale 1 can be manufactured.

As explained above, the manufacturing method for the encoder scale 1 includes a step of performing the anisotropic etching on one surface of the tabular base material 2a and forming an inclined surface region configured mainly by a surface (the inclined surface 211) inclined with respect to a surface having a normal line in the thickness direction of the base material 2a and a step of applying the photosensitive resin on one surface of the base material 2a and patterning the photosensitive resin to thereby form the resin layer 3 and thereafter forming the metal film 4a on the resin layer 3 to thereby form a thickness direction normal line surface region configured mainly by the surface having the normal line in the thickness direction of the base material 2a. With such a manufacturing method for the encoder scale 1, it is possible to obtain the encoder scale 1 that can improve detection accuracy while achieving a reduction in cost.

By performing the etching step S10 and the resin layer forming step S20 in this order, the dimension accuracy of the first region 121 and the second region 122 can be set extremely high. On the other hand, if the resin layer forming step S20 and the etching step S10 are performed in this order, in the etching step S10, both ends of a resin layer are lifted because an etching state (in particular, a side etching amount) is different depending on a position in the circumferential direction of the base material 2. A risk of breakage due to deterioration in adhesion occurs.

Second Embodiment

Figure 17:
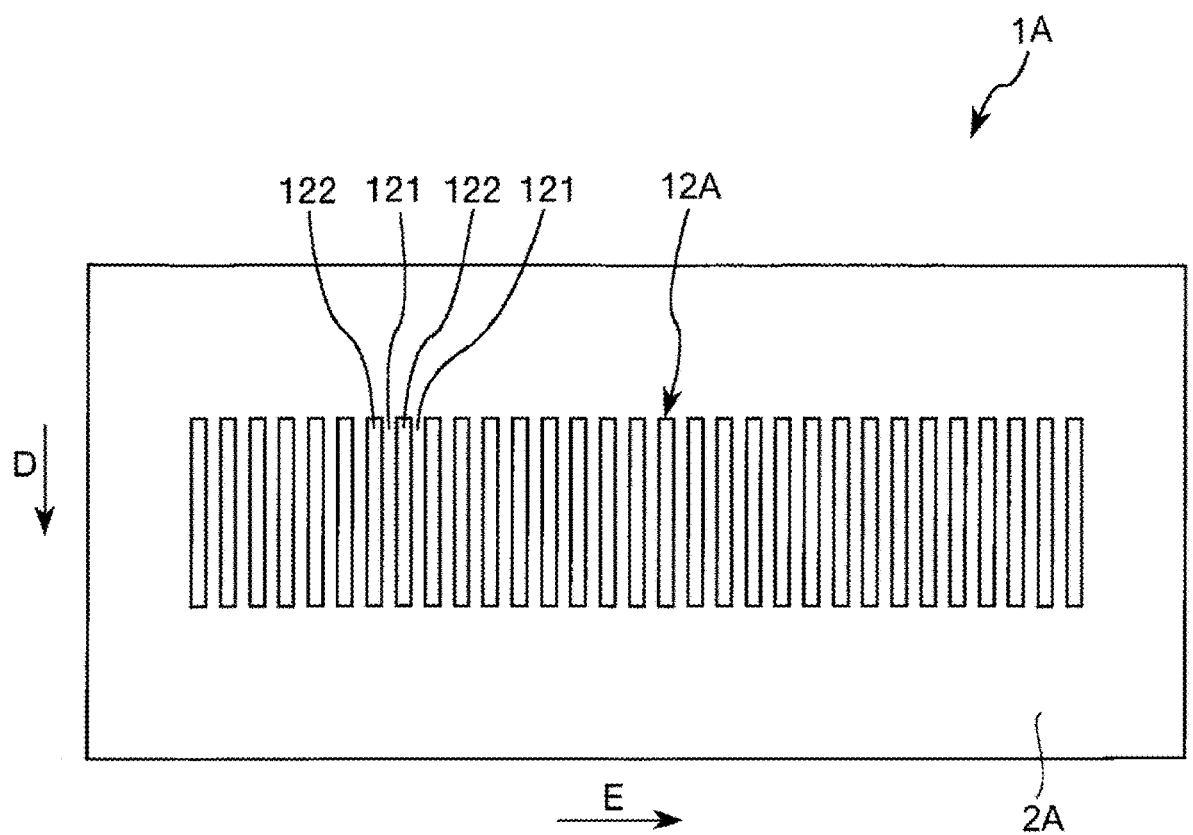
FIG. 17 is a sectional view showing an encoder scale according to a second embodiment of the invention.

FIG. 17 is a sectional view showing an encoder scale according to a second embodiment of the invention. Note that, in the following explanation, concerning this embodiment, differences from the first embodiment are mainly explained. Explanation of similarities to the first embodiment is omitted.

An encoder scale 1A shown in FIG. 17 includes a base material 2A formed in a tabular shape. On one surface of the base material 2A, an optical pattern 12A in which the first regions 121 and the second regions 122 are alternately disposed side by side along a direction E is formed as a pattern with which a moving amount, moving speed, and the like in the direction E in the figure of the encoder scale 1A can be detected. Such an encoder scale 1A can be used in a linear encoder.

The first regions 121 and the second regions 122 of the optical pattern 12A respectively extend along a direction D orthogonal to the direction E in the plan view. The widths of the first regions 121 and the second region 122 are respectively fixed in the direction D in the plan view. A shape in the plan view of the base material 2A is a rectangle having a long side in the direction E.

As in the first embodiment explained above, such an encoder scale 1A can be easily and highly accurately formed using the (100) single crystal silicon. In this case, a crystal orientation (110) is desirably along the direction D. Consequently, it is possible to easily improve dimension accuracy of the first regions 121 and the second regions 122.

With the encoder scale 1A according to the second embodiment explained above, as in the first embodiment, it is possible to improve the detection accuracy while achieving a reduction in cost.

Robot

A robot according to an embodiment of the invention is explained below with reference to a single-arm robot as an example.

Figure 18:
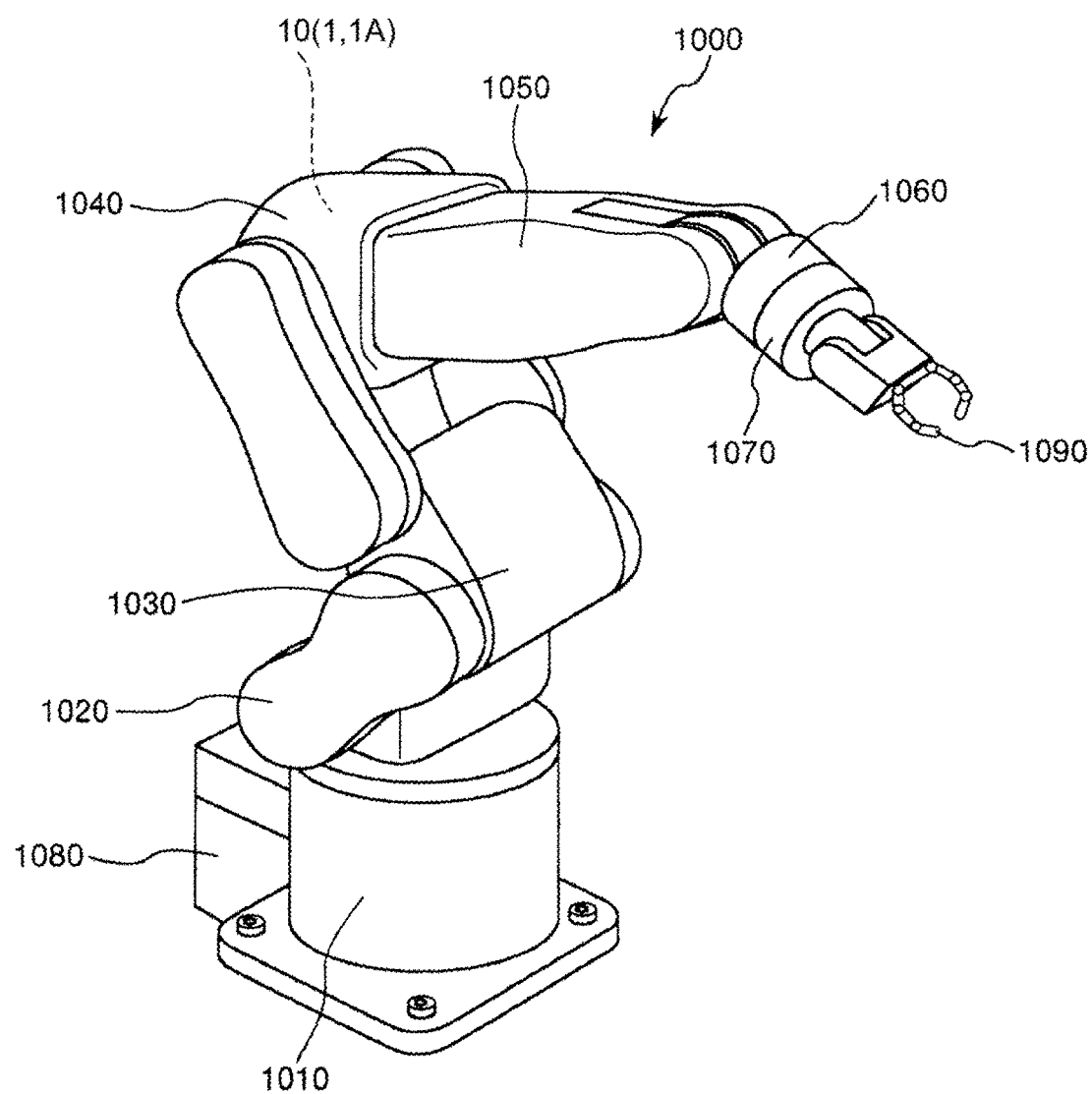
FIG. 18 is a perspective view showing a robot according to an embodiment of the invention.

FIG. 18 is a perspective view showing the robot according to the embodiment.

A robot 1000 shown in FIG. 18 can perform work such as supply, removal, conveyance, and assembly of a precision instrument and components configuring the precision instrument (target objects). The robot 1000 is a six-axis robot. The robot 1000 includes a base 1010 fixed to a floor or a ceiling, an arm 1020 turnably coupled to the base 1010, an arm 1030 turnably coupled to the arm 1020, an arm 1040 turnably coupled to the arm 1030, an arm 1050 turnably coupled to the arm 1040, an arm 1060 turnably coupled to the arm 1050, an arm 1070 turnably coupled to the arm 1060, and a control section 1080 configured to control driving of the arms 1020, 1030, 1040, 1050, 1060, and 1070. A hand connecting section is provided in the arm 1070. An end effector 1090 corresponding to work to be executed by the robot 1000 is attached to the hand connecting section.

The encoder 10 is mounted on all or a part of a plurality of joint sections included in the robot 1000. The control section 1080 controls driving of the joint section on the basis of an output of the encoder 10. Note that, in FIG. 18, the encoder 10 is provided in a joint section between the arm 1040 and the arm 1050.

The robot 1000 explained above includes the encoder scale 1 or 1A. With such a robot 1000, it is possible to achieve a reduction in the cost of the robot 1000 by achieving a reduction in the cost of the encoder scale 1 or 1A. It is possible to perform highly accurate operation control on the basis of a highly accurate detection result obtained using the encoder scale 1 or 1A.

Note that the number of arms included in the robot 1000 is six in FIG. 18. However, the number of arms is not limited to this and may be one to five or seven or more.

Electronic-Component Conveying Apparatus

An electronic-component conveying apparatus according to the embodiment is explained.

Figure 19:
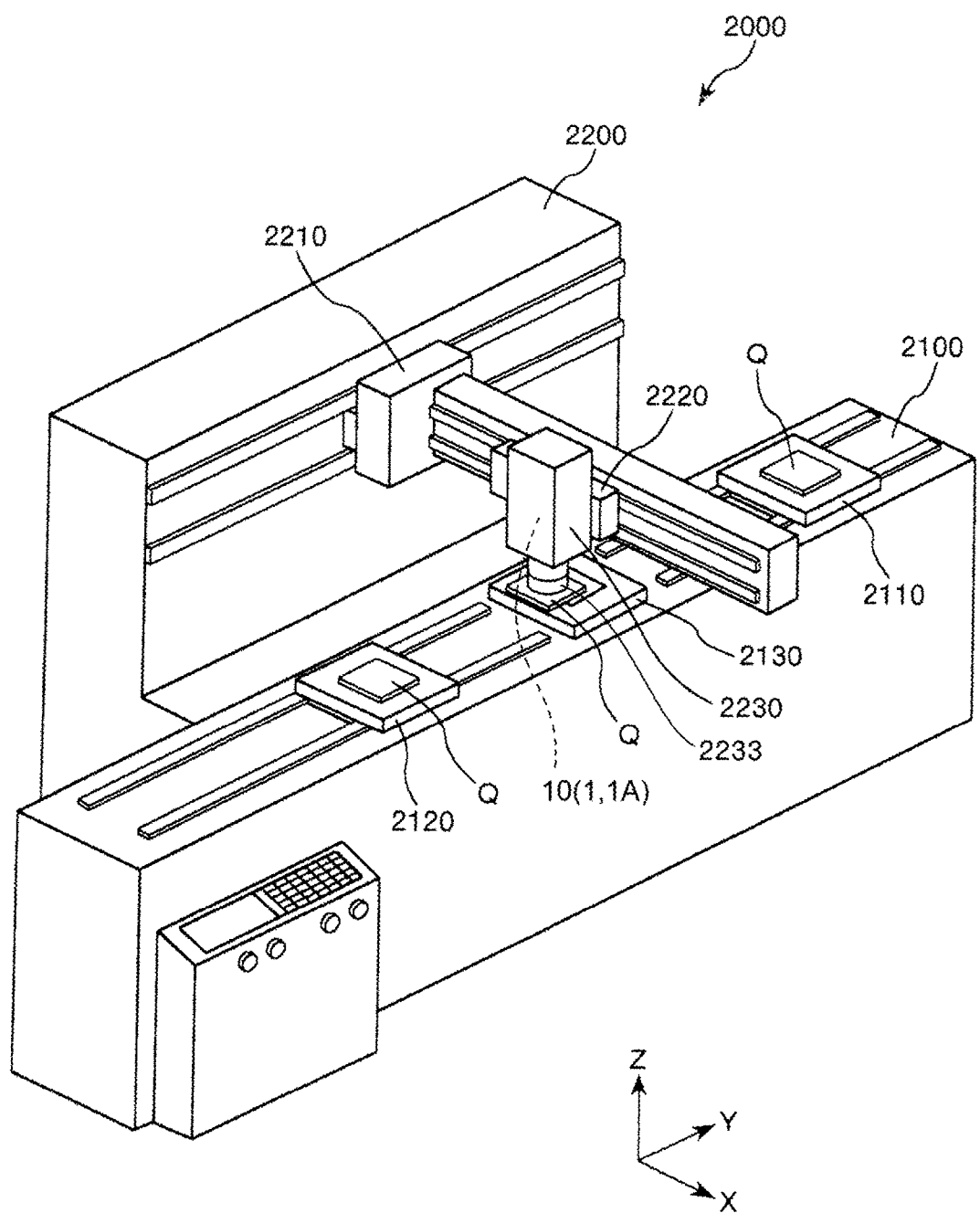
FIG. 19 is a perspective view showing an electronic-component conveying apparatus according to the embodiment.

FIG. 19 is a perspective view showing the electronic-component conveying apparatus according to the embodiment. Note that, in the following explanation, for convenience of explanation, three axes orthogonal to one another are represented as an X axis, a Y axis, and a Z axis.

An electronic-component conveying apparatus 2000 shown in FIG. 19 is applied to an electronic-component inspecting apparatus. The electronic-component conveying apparatus 2000 includes a base 2100 and a supporting table 2200 disposed on a side of the base 2100. In the base 2100, an upstream-side stage 2110 on which an inspection target electronic component Q is placed and conveyed in the Y-axis direction, a downstream-side stage 2120 on which an inspected electronic component Q is placed and conveyed in the Y-axis direction, and an inspection table 2130 located between the upstream-side stage 2110 and the downstream-side stage 2120 and used to inspect an electric characteristic of the electronic component Q are provided. Note that examples of the electronic component Q include a semiconductor, a semiconductor wafer, a display device such as a CLD or an OLED, a crystal device, various sensors, an inkjet head, and various MEMS devices.

On the supporting table 2200, a Y stage 2210 movable in the Y-axis direction with respect to the supporting table 2200 is provided. On the Y stage 2210, an X stage 2220 movable in the X-axis direction with respect to the Y stage 2210 is provided. On the X stage 2220, an electronic-component holding section 2230 movable in the Z-axis direction with respect to the X stage 2220 is provided.

The electronic-component holding section 2230 includes a holding section 2233 configured to hold the electronic component Q. The electronic-component holding section 2230 is configured to be capable of finely adjusting positions in the X-axis direction and the Y-axis direction and a posture around the Z axis of the holding section 2233. The electronic-component holding section 2230 includes an encoder 10 configured to detect the posture around the Z axis of the holding section 2233.

The electronic-component conveying apparatus 2000 explained above includes the encoder scale 1 or 1A. With such the electronic-component conveying apparatus 2000, it is possible to achieve a reduction in the cost of the electronic-component conveying apparatus 2000 by achieving a reduction in the cost of the encoder scale 1 or 1A. It is possible to perform highly accurate operation control on the basis of a highly accurate detection result obtained by using the encoder scale 1.

Printer

Figure 20:
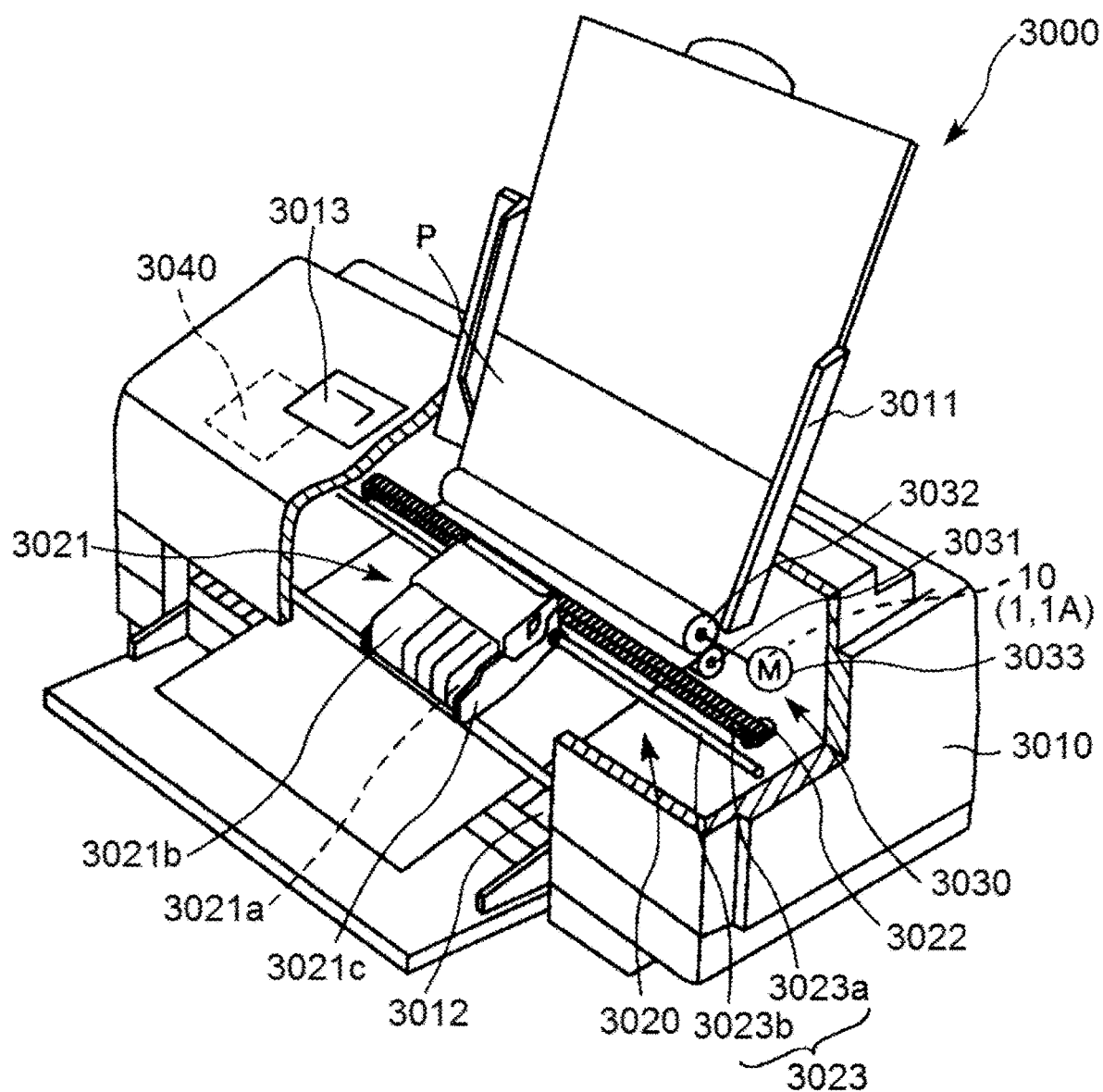
FIG. 20 is a perspective view showing a printer according to the embodiment.

FIG. 20 is a perspective view showing a printer according to the embodiment.

A printer 3000 shown in FIG. 20 is a printer of an inkjet recording type. The printer 3000 includes an apparatus body 3010 and a printing mechanism 3020, a paper feeding mechanism 3030, and a control section 3040 provided on the inside of the apparatus body 3010.

In the apparatus body 3010, a tray 3011 in which recording sheets P are set, a paper discharge port 3012 for discharging the recording sheets P, and an operation panel 3013 such as a liquid crystal display are provided.

The printing mechanism 3020 includes ahead unit 3021, a carriage motor 3022, and a reciprocating mechanism 3023 configured to reciprocate the head unit 3021 with a driving force of the carriage motor 3022. The head unit 3021 includes a head 3021a, which is an inkjet recording head, an ink cartridge 3021b configured to supply ink to the head 3021a, and a carriage 3021c mounted with the head 3021a and the ink cartridge 3021b. The reciprocating mechanism 3023 includes a carriage guide shaft 3023a configured to support the carriage 3021c to be capable of reciprocating and a timing belt 3023b for moving the carriage 3021c on the carriage guide shaft 3023a with a driving force of the carriage motor 3022.

The paper feeding mechanism 3030 includes a driven roller 3031 and a driving roller 3032 that are in pressed contact with each other, a paper feeding motor 3033 configured to drive the driving roller 3032, and the encoder 10 configured to detect a rotation state of a rotating shaft of the paper feeding motor 3033.

The control section 3040 controls the printing mechanism 3020, the paper feeding mechanism 3030, and the like on the basis of printing data input from a host computer such as a personal computer.

In such a printer 3000, the paper feeding mechanism 3030 intermittently feeds the recording sheets P one by one to the vicinity of a lower part of the head unit 3021. At this time, the head unit 3021 reciprocates in a direction substantially orthogonal to a feeding direction of the recording sheet P. Printing on the recording sheet P is performed.

The printer 3000 explained above includes the encoder scale 1 or 1A. With such a printer 3000, it is possible to achieve a reduction in the cost of the printer 3000 by achieving a reduction in the cost of the encoder scale 1 or 1A. It is possible to perform highly accurate operation control on the basis of a highly accurate detection result obtained using the encoder scale 1 or 1A.

Projector

Figure 21:
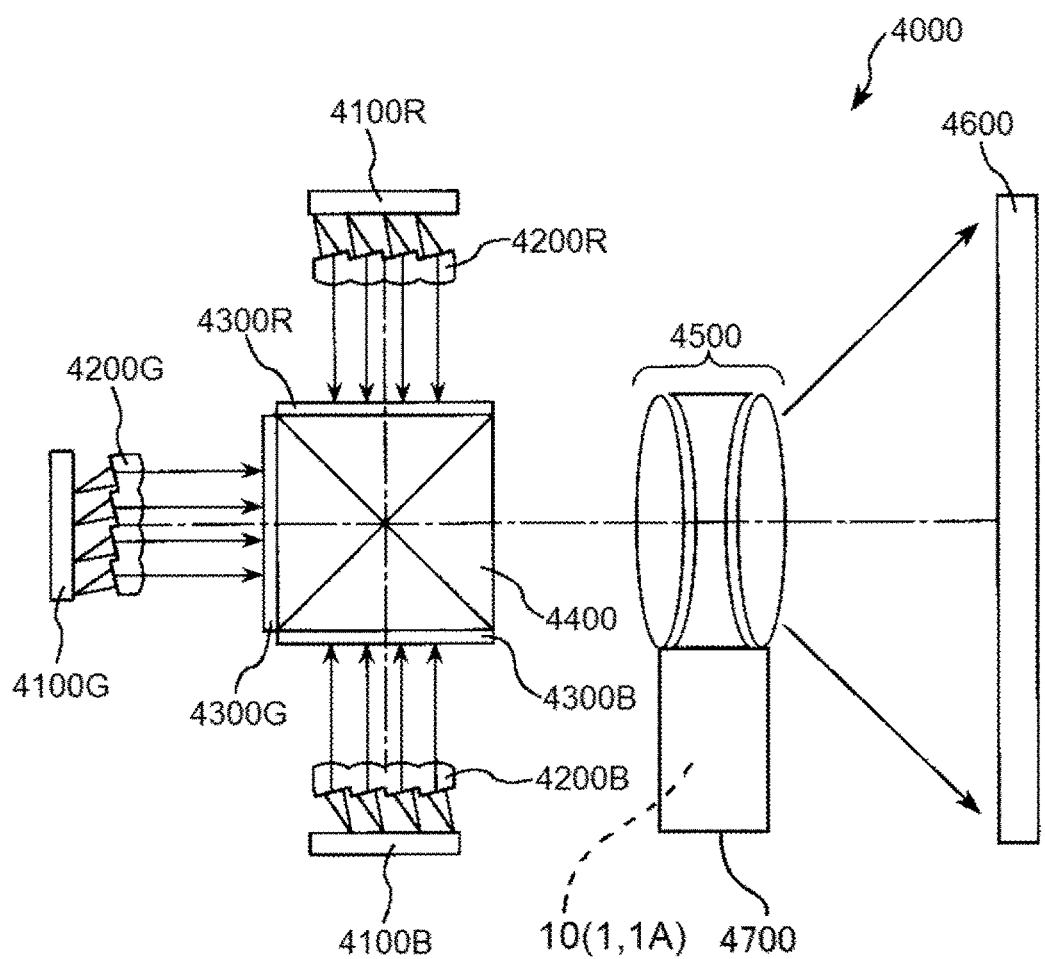
FIG. 21 is a schematic diagram showing a projector according to the embodiment.

FIG. 21 is a schematic diagram showing a projector according to the embodiment.

A projector 4000 shown in FIG. 21 includes a light source 4100R configured to emit red light, a light source 4100G configured to emit green light, a light source 4100B configured to emit blue light, lens arrays 4200R, 4200G, and 4200B, liquid crystal light valves (light modulating sections) 4300R, 4300G, and 4300B of a transmission type, a cross dichroic prism 4400, a projection lens (a projecting section) 4500, and a piezoelectric driving device 4700.

Lights emitted from the light sources 4100R, 4100G, and 4100B are made incident on the liquid crystal light valves 4300R, 4300G, and 4300B via the lens arrays 4200R, 4200G, and 4200B. The liquid crystal light valves 4300R, 4300G, and 4300B respectively modulate the incident lights according to image information.

Three color lights modulated by the liquid crystal light valves 4300R, 4300G, and 4300B are made incident on the cross dichroic prism 4400 and combined. Light combined by the cross dichroic prism 4400 is made incident on the projection lens 4500, which is a projection optical system. The projection lens 4500 enlarges an image formed by the liquid crystal light valves 4300R, 4300G, and 4300B and projects the image onto a screen (a display surface) 4600. Consequently, a desired video is projected on the screen 4600. The projection lens 4500 is supported by the piezoelectric driving device 4700. A change (positioning) of a position and a posture is enabled by driving of the piezoelectric driving device 4700. Consequently, a shape, a size, and the like of the video projected on the screen 4600 can be adjusted. The piezoelectric driving device 4700 includes the encoder 10 for detecting a driving state of the piezoelectric driving device 4700.

Note that, in the example explained above, the liquid crystal light valve of the transmission type is used as the light modulating section. However, a light valve other than the liquid crystal light valve may be used or a light valve of a reflection type may be used. Examples of such a light valve include a liquid crystal light valve of a reflection type and a digital micromirror device. The configuration of the projection optical system is changed as appropriate according to a type of a light valve in use. The projector may be a projector of a scanning type that scans light on a screen to thereby display an image having a desired size on a display surface.

The projector 4000 explained above includes the encoder scale 1 or 1A. With such a projector 4000, it is possible to achieve a reduction in the cost of the projector 4000 by achieving a reduction in the cost of the encoder scale 1 or 1A. It is possible to perform highly accurate operation control on the basis of a highly accurate detection result obtained using the encoder scale 1 or 1A.

The embodiments of the invention are explained above with reference to the drawings. However, the invention is not limited to the embodiments. The components of the sections can be replaced with any components having the same functions. Any other components may be added.

In the invention, any two or more configurations (characteristics) in the embodiments may be combined.

The robot according to the embodiment is not limited to the single-arm robot as long as the robot includes arms and may be other robots such as a double-arm robot and a SCARA robot.

In the embodiments, the configuration is explained in which the encoder scale unit and the encoder are applied to the robot and the printer. However, the encoder scale unit and the encoder can be applied to various electronic apparatuses other than these apparatuses as well. When the encoder is used in the printer, the encoder is not limited to the driving source of the paper feeding roller of the printer. The encoder can also be applied to, for example, a driving source of an inkjet head of the printer.

The encoder according to the embodiment may be incorporated in an apparatus other than the robot and may be mounted on a mobile body such as an automobile.

The entire disclosure of Japanese Patent Application No. 2017-209385, filed Oct. 30, 2017 is expressly incorporated by reference herein.

What is claimed is:

1. An encoder scale comprising:
   a tabular base material; and
   an optical pattern provided above one surface of the base material, a first region and a second region being disposed side by side above the optical pattern, wherein the first region includes:
      a resin layer disposed above the base material and including photosensitive resin; and
      a metal film disposed above the resin layer,
   a surface of the first region is configured mainly by a first surface having a normal line in a thickness direction of the base material, and
   a surface of the second region is configured mainly by a second surface inclined with respect to the first surface.

2. The encoder scale according to claim 1, wherein the base material is formed of an anisotropically etchable crystal material.

3. The encoder scale according to claim 2, wherein the crystal material is single crystal silicon.

4. The encoder scale according to claim 3, wherein a plane orientation of the single crystal silicon is (100).

5. The encoder scale according to claim 2, wherein the second surface is provided along a crystal surface of the crystal material.

6. The encoder scale according to claim 1, wherein the photosensitive resin is a negative type.

7. A manufacturing method for an encoder scale comprising:
   performing anisotropic etching above one surface of a tabular base material and forming an inclined surface region configured mainly by a surface inclined with respect to a surface having a normal line in a thickness direction of the base material; and
   applying photosensitive resin above the one surface and patterning the photosensitive resin to form a resin layer and thereafter forming a metal film above the resin layer to thereby form a thickness direction normal line surface region configured mainly by a surface having a normal line in the thickness direction of the base material.

8. An encoder comprising:
   the encoder scale according to claim 1;
   a light emitting section configured to emit light toward the encoder scale; and
   a light detecting section configured to detect the light reflected on the encoder scale.

9. An encoder comprising:
   the encoder scale according to claim 2;
   a light emitting section configured to emit light toward the encoder scale; and
   a light detecting section configured to detect the light reflected on the encoder scale.

10. An encoder comprising:
the encoder scale according to claim 3;
a light emitting section configured to emit light toward the encoder scale; and
a light detecting section configured to detect the light reflected on the encoder scale.

11. An encoder comprising:
the encoder scale according to claim 4;
a light emitting section configured to emit light toward the encoder scale; and
a light detecting section configured to detect the light reflected on the encoder scale.

12. An encoder comprising:
the encoder scale according to claim 5;
a light emitting section configured to emit light toward the encoder scale; and
a light detecting section configured to detect the light reflected on the encoder scale.

13. An encoder comprising:
the encoder scale according to claim 6;
a light emitting section configured to emit light toward the encoder scale; and
a light detecting section configured to detect the light reflected on the encoder scale.

* * * * *